United States Patent [19]
Parete

[11] Patent Number: 5,940,961
[45] Date of Patent: Aug. 24, 1999

[54] AUTOMOTIVE FRAMING SYSTEM

[75] Inventor: Anthony Parete, St. Clair Beach, Canada

[73] Assignee: Valiant Machine & Tool Inc., Canada

[21] Appl. No.: 08/946,768

[22] Filed: Oct. 8, 1997

[51] Int. Cl.[6] .................................................. B23P 21/00
[52] U.S. Cl. .............................. 29/784; 29/787; 29/795; 29/799; 29/822; 29/35.5; 228/49.1
[58] Field of Search ................................. 29/33 J, 35.5, 29/39, 48.5 R, 783, 784, 787, 791, 795, 799, 822, 785, 792, 823; 228/49.1

[56] References Cited

U.S. PATENT DOCUMENTS

| | | | |
|---|---|---|---|
| 4,548,346 | 10/1985 | Kraus et al. | 228/48 |
| 4,670,961 | 6/1987 | Fontaine et al. | 29/429 |
| 4,736,515 | 4/1988 | Catena | 29/783 |
| 4,928,383 | 5/1990 | Kaczmarek et al. | 29/791 |
| 5,011,068 | 4/1991 | Stoutenbourg et al. | 228/49.1 |
| 5,191,958 | 3/1993 | Tolocko | 29/799 |
| 5,400,943 | 3/1995 | Rossi | 228/49.1 |
| 5,409,158 | 4/1995 | Angel | 228/49.1 |
| 5,427,300 | 6/1995 | Quagline | 228/49.1 |

*Primary Examiner*—David P. Bryant
*Attorney, Agent, or Firm*—Gifford, Krass, Groh, Sprinkle, Anderson & Citkowski, P.C.

[57] ABSTRACT

An automotive framing system for positioning a lower body component and at least two upper body components together at precise positions relative to each other prior to fixedly securing the body components together. The framing system includes a conveyor for sequentially moving body preassemblies to a predetermined assembly station. A lifter at the assembly station lifts the lower body component and upper body components from the conveyor to a predetermined elevated position in which the lower body component abuts against the upper body components. At least two turret assemblies are movably mounted to a ground support surface in a direction transverse to the conveyor. The turret assemblies are positioned at opposite ends of the assembly station and movable between an operative position in which the turret assemblies are aligned with the conveyor, and a standby position in which the turret assemblies are laterally spaced from the conveyor. Each turret includes a base and at least two circumferentially spaced arms each having one end pivotally secured to the base. The bases are selectively indexed so that one arm on each turret assembly faces the assembly station and the arms are movable between a raised position in which the arms extend upwardly from the base, and a lower position in which the other ends of the arms extend over the top of the body preassembly and abut against each other. Clamps are mounted to each arm for selectively engaging the body components at predetermined location positions in order to hold the body components at precise positions relative to each other.

10 Claims, 4 Drawing Sheets

AUTOMOTIVE FRAMING SYSTEM

BACKGROUND OF THE INVENTION

I. Field of the Invention

The present invention relates to an automotive framing system for accurately positioning upper and lower body components relative to each other prior to securing the body components together.

II. Description of the Prior Art

In the manufacture of automotive vehicles, a conveyor system typically transports a body preassembly sequentially along the conveyor line. Such body preassemblies comprise a lower body component, e.g. the lower body frame, and two or more upper body components which are supported by the lower body component. The upper and lower body components, however, are not fixedly secured to each other in the preassembly. Instead, the upper and lower body components are merely loosely fastened together.

In order to fixedly secure the upper and lower body components together, it is imperative that the upper and lower body components be precisely positioned relative to each other prior to welding or otherwise securing the body components together. In order to accomplish such precision positioning of the upper and lower body components, there have been previously known framing systems.

One such previously known framing system is disclosed in U.S. Pat. No. 4,670,961 to Fontaine et al. which issued on Jun. 9, 1987. In this prior art framing system, a gantry is positioned above an assembly station at a mid-point of the conveyor line. The gantry includes clamping arms movable between a raised and a lowered position. In their raised position, the clamping arms are positioned away from the preassembly to allow the next preassembly to be moved by the conveyor system into the assembly station. Conversely, in their engaged position, the arms swing downwardly while clamps on the arms engage predetermined location points on the various body components and clamp the body components together at a preset position relative to each other. With the body components clamped together, robotic welders or the like are used to fixedly secure the body components together.

In automotive manufacturing operations, however, it is commonplace to utilize the same conveyor line to transport vehicle preassemblies of different body styles. The location points on the body components for these different styles differ from one style to the next.

In order to accommodate different types of vehicles on a common conveyor line, the previously known framing systems have utilized a turntable positioned above the work station and rotatable about a vertical axis. The turntable then indexes to provide up to four different sets of arms and clamps to selectively engage the location points on up to four different styles of automotive vehicles.

The previously known framing systems, however, suffer from a number of disadvantages. One such disadvantage is that, since the framing system is mounted wholly above the assembly station and includes an indexable turntable for bringing different clamping arms into position above the work station, the entire framing system necessarily requires a great amount of headroom at the assembly station. Such headroom, however, may not be available at the automotive manufacturing site. Furthermore, since the entire framing system is elevated above the assembly station, maintenance and maintenance access is rendered more difficult.

Secondly, these previously known framing systems are very costly to manufacture due in large part to the necessity of the turntable and movable arms.

SUMMARY OF THE PRESENT INVENTION

The present invention provides a framing system for automotive vehicles which overcomes all of the above-mentioned disadvantages of the previously known systems.

In brief, the automotive framing system of the present invention comprises a conveyor means for sequentially moving body preassemblies to a predetermined assembly station along the conveyor line. As before, each body preassembly comprises a lower body component, i.e. the lower body frame, and two or more upper body components which are carried by the lower body component. Typically, a skid is associated with each preassembly and the skid is positioned between rails which form the conveyor line and the lower body component.

With the body preassembly positioned at the assembly station, means are provided at the assembly station for lifting the lower body component up from the skid to a predetermined elevated position in which the lower body component abuts against the upper body components. The lifting means, furthermore, includes precision locator pins which engage precise positions or openings on the lower body component so that, with the lifting means moved to its upper position, the lifting means positions the lower body component at a precise vertical and longitudinal position within the assembly station.

The framing system further includes at least two turret assemblies and means for movably mounting each turret assembly to a ground support surface in a direction transverse to the conveyor means. One turret assembly is positioned adjacent one end of the assembly station while the other turret assembly is positioned adjacent the opposite end of the assembly station. Each turret assembly is movable between an operative position in which the turret assemblies are aligned with the conveyor means, and a standby position in which the turret assemblies are laterally spaced from the conveyor means to allow the body assemblies to both enter into and exit from the assembly station.

Each turret assembly, furthermore, comprises a base and at least two circumferentially spaced arms wherein each arm includes one end pivotally secured to the base. Means are also provided for selectively indexing the base between at least two rotational positions wherein, in each rotational position, one of the arms on each turret assembly faces the assembly station.

The framing system further includes means for pivoting the arms between a raised position, in which the arms extend upwardly from the base, and a lowered position, in which the arms extend over a vehicle preassembly positioned in the assembly station and such that the opposite or free ends of the arms abut against each other. In doing so, the geometry of the arms relative to each other, and thus to the assembly station, is fixed.

Clamping means are mounted to each of the arms and are selectively movable between an engaged position and a released position. In the engaged position, the clamping means engage predetermined location points on the upper and/or lower body components of the body preassembly and hold the upper and lower body components of the preassembly together at precise preset positions relative to each other. Conventional means, such as robotic welders, then fixedly secure the body components together.

Conversely, in their released position, the clamping means disengage from the body preassembly and the arms are returned to their raised position. Thereafter, the turret assembly is transversely moved to its standby position to allow the now-assembled body components to exit from the assembly station and simultaneously enable a sequential body preassembly to enter into the assembly station.

Each turret assembly includes at least two, and up to four different arms, each of which has their own customized clamping means. Consequently, up to four different body styles can be accommodated within a single assembly station by selectively indexing the turret assembly such that the required arms face the assembly station prior to being moved to their lower position.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
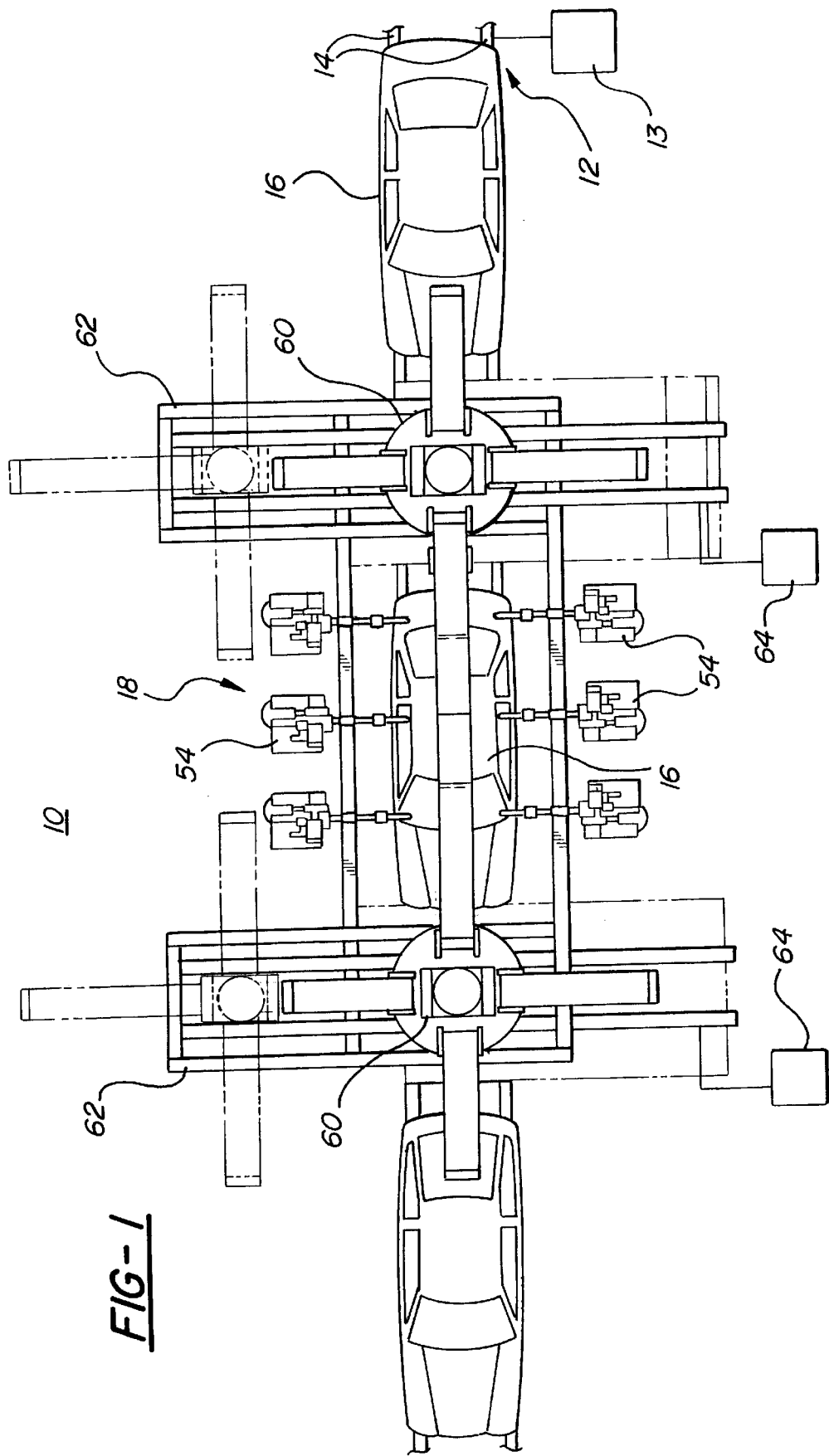
FIG. 1 is a top plan view illustrating a preferred embodiment of the present invention.
Figure 2:
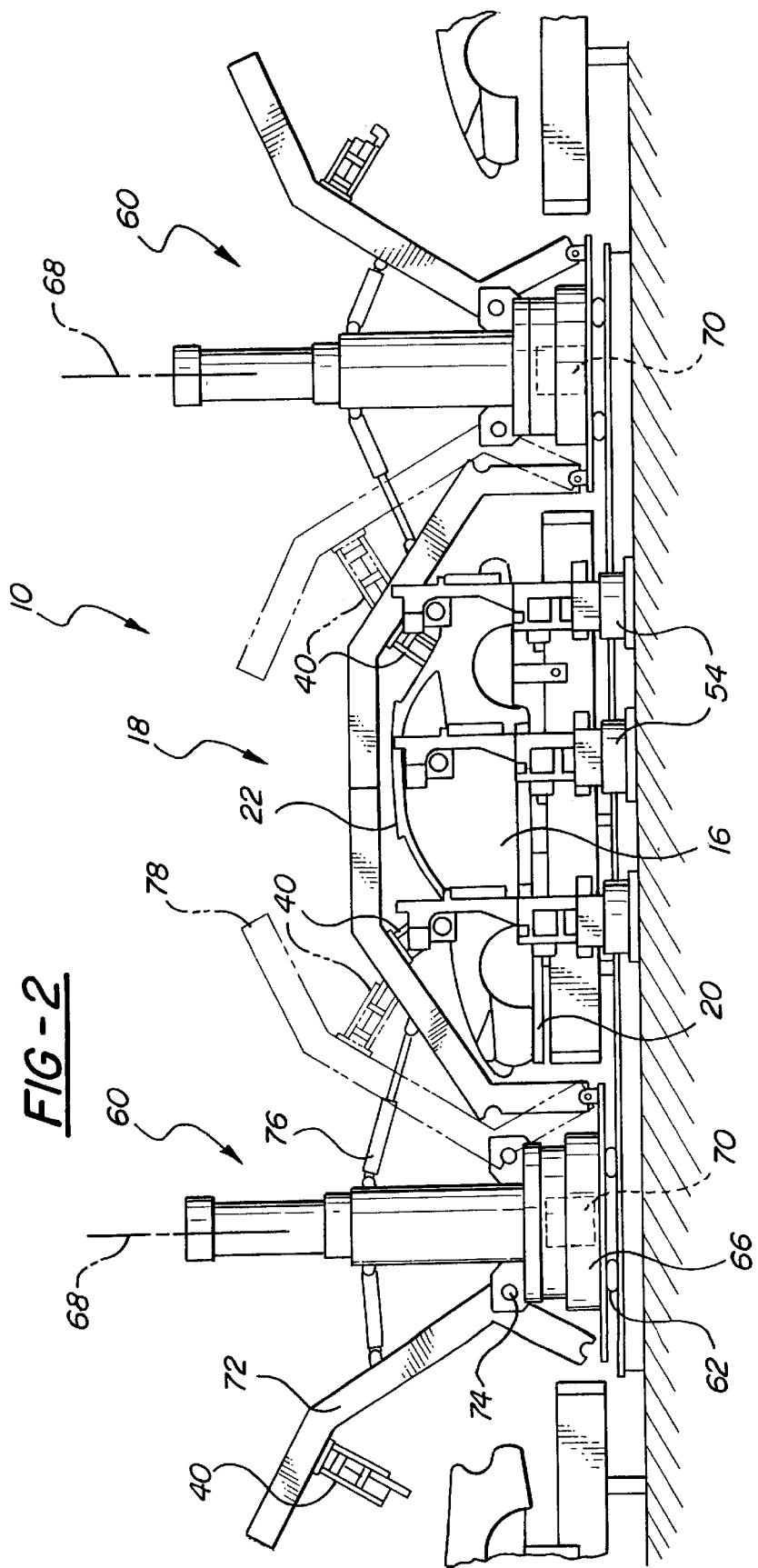
FIG. 2 is a side view illustrating a preferred embodiment of the present invention.

With reference first to FIGS. 1 and 2, a preferred embodiment of the framing system 10 of the present invention is thereshown for use with a manufacturing line for automotive vehicles. An elongated conveyor 12, preferably comprising a pair of spaced apart rails 14, sequentially conveys automotive body preassemblies 16 to a assembly station 18 at a mid-point on the conveyor 12. Any conventional drive means 13 (illustrated only diagrammatically) is used to power the conveyor 12. Each body preassembly 16, furthermore, includes a lower body component 20, i.e. the lower frame, and two or more upper body components 22 which are unattached to each other except by restraining tags.

Figure 3:
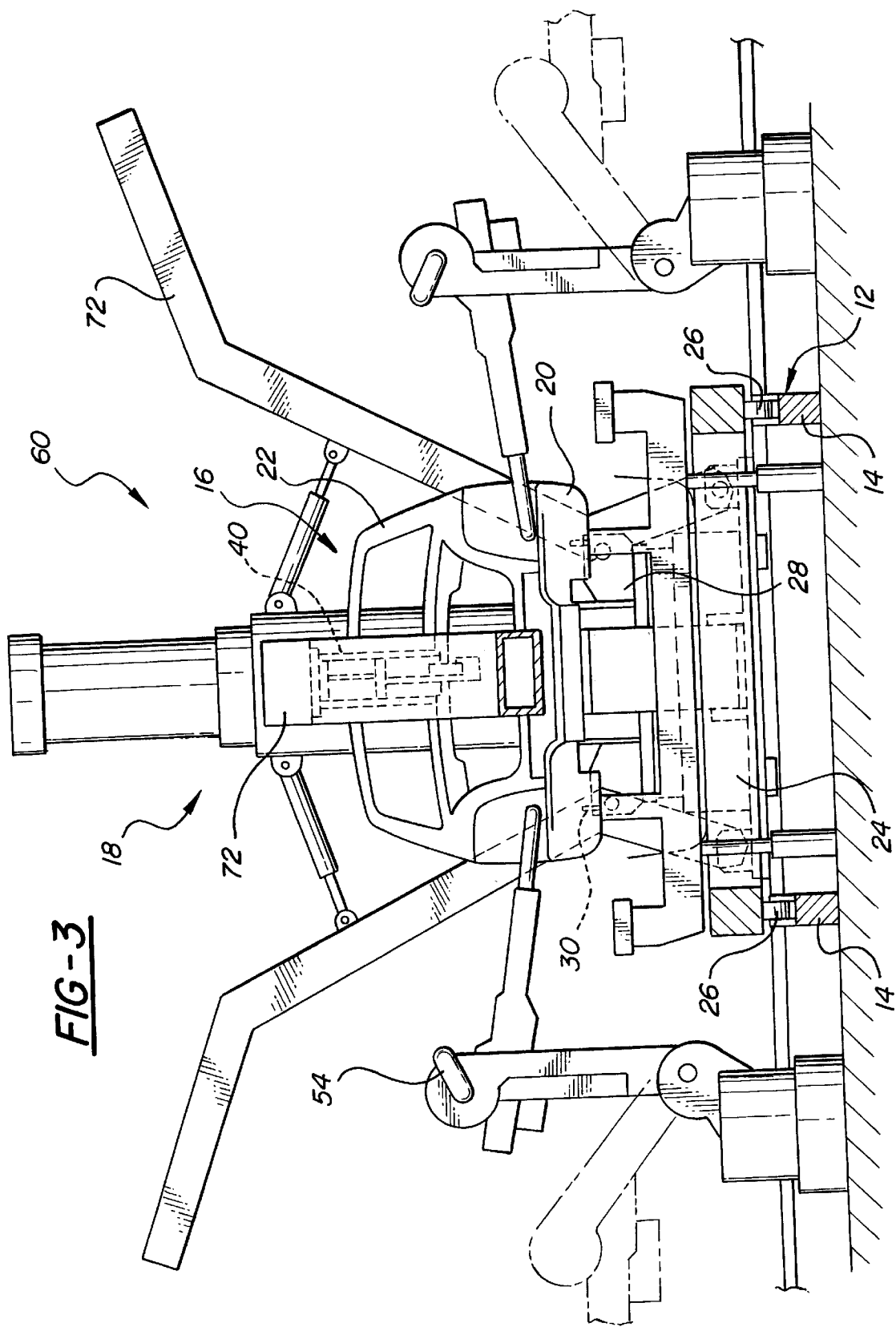
FIG. 3 is a front view illustrating the preferred embodiment of the present invention.

As best shown in FIG. 3, a skid 24 is movably mounted to the rails 14 by rollers 26. One skid 24 is associated with each body preassembly 16 and the skid 24 supports the lower body component 20. The upper body components 22 in turn sit on top of the lower body component 20.

As best shown in FIG. 3, with the body preassembly 16 positioned at the assembly station 18, a lifting means 28 is actuated and moves under the body preassembly 16 from a lower position, illustrated in phantom line in FIG. 2, to a raised position, illustrated in solid line in FIG. 2. With the lifting assembly 28 in its lower position, the lower body component 20 is supported by the skid 24. Conversely, as the lifting assembly 28 is moved to its upper position, locating pins 30 on the lifting assembly 28 engage locating holes in the lower body component 20. Furthermore, with the lifting assembly 28 in its uppermost position, the lower body component 20 is precisely positioned both vertically and longitudinally within the assembly station 18 and is also in abutment with the upper body components 22.

With reference now particularly to FIGS. 1 and 2, in order to precisely position the body components 20 and 22 relative to each other, the framing system 10 includes a pair of turret assemblies 60. The turret assemblies 60 are movably mounted in a direction transverse to the conveyor 12 on slides 62 adjacent opposite ends of the assembly station 18. Each turret assembly 60 is movable between a standby position, illustrated in phantom line in FIG. 1 in which the turret assembly 60 is laterally based from the conveyor 12, and an operative position, illustrated in solid line in FIG. 1 in which the turret assembly 60 is aligned with the conveyor 12. Any conventional means 64 (illustrated only diagrammatically) may be utilized to move the turret assemblies 60 between their standby position and operative position.

Still referring to FIGS. 1 and 2, the turret assemblies 60 are substantially identical to each other and include a base 66 which is not only laterally movable relative to the conveyor 12 along the slide 62, but also rotatably indexable about a vertical axis 68 (FIG. 2) for a reason to be shortly described. Any conventional 20 means 70 (illustrated only diagrammatically) can be employed to rotatably index the base 66 about its vertical axis 68.

At least two, and preferably four, elongated arms 72 have one end pivotally mounted by pins 74 to the base 66. An actuator 76 is associated with each arm 72 to move its associated arm 72 between a raised position, illustrated in phantom line in FIG. 2 in which the arm 72 extends upwardly from the base 66, and a lower position, illustrated in solid line in FIG. 2 in which the arm 72 extends over the body preassembly 16 positioned at the assembly station 18. Furthermore, with the arm 72 facing the assembly station 18 in their lower position, the free or other ends 78 of the arms 72 on the opposite turret assemblies 60 abut against each other and fix their geometry or position relative to each other and the assembly station 18.

Figure 4:
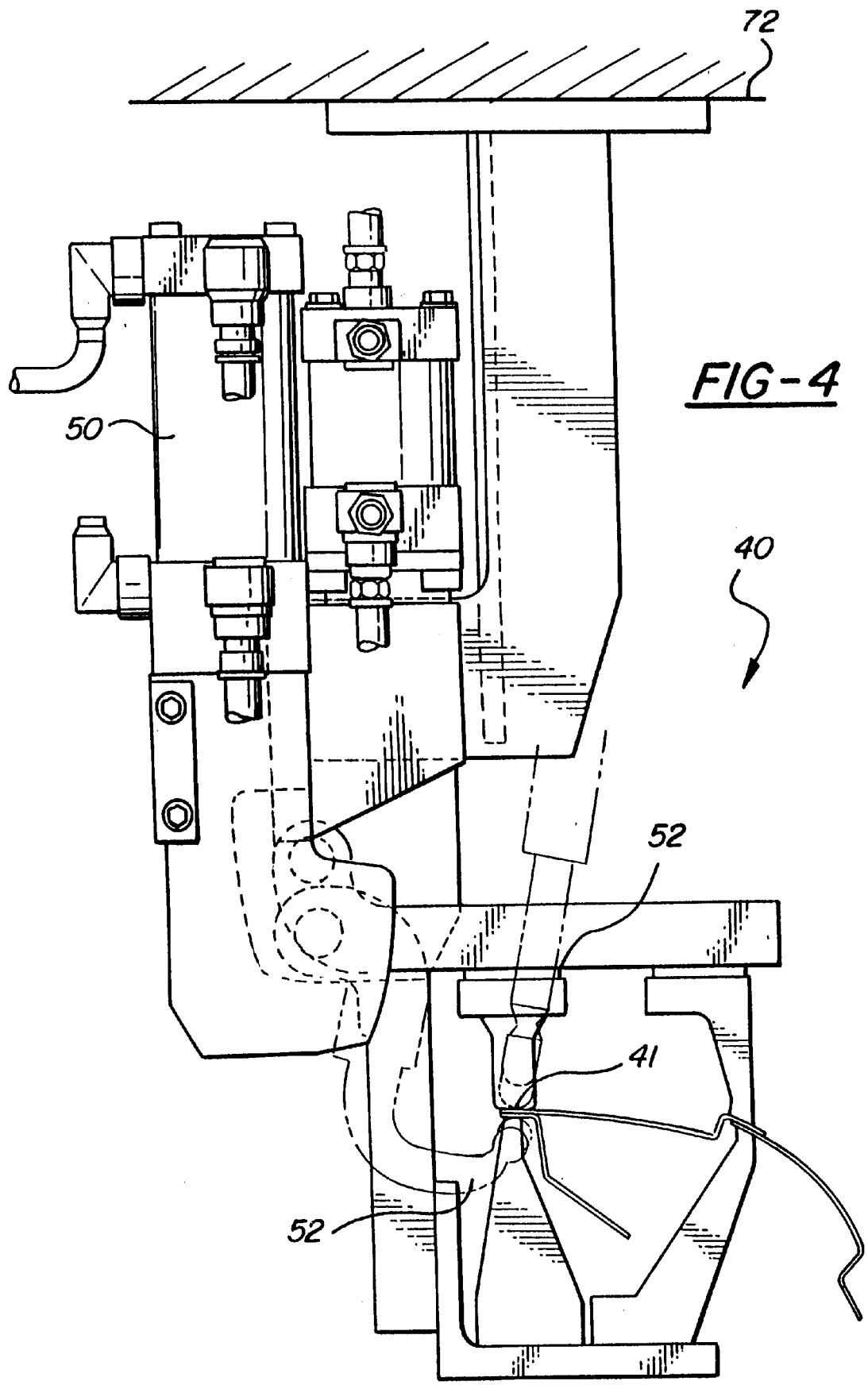
FIG. 4 is a view illustrating an exemplary clamping assembly for use with the present invention.

With reference now to FIGS. 2 and 4, at least one and preferably several clamping means 40 are carried by each arm 72 on each turret assembly 60. The precise clamping means 40 will vary depending upon the particular style and size of the body preassembly 16. However, an exemplary clamping means 40 is shown in FIG. 4 and includes an actuator 50 which selectively moves pinching fingers 52 between an open position, illustrated in phantom line, and a closed position, illustrated in solid line. In its engaged position, the clamping means 40 engages predetermined location areas 41 on the body components 20 and/or 22 and thus maintains these body components at a fixed and predetermined position relative not only to the arm 72, but also relative to each other. Consequently, with the clamping means 40 in the engaged position and the body components 20 and 22 properly positioned with respect to each other, conventional means, such as robotic welders 54 (FIG. 1) are then used to fixedly secure the body components 20 and/or 22 together.

Following the welding of the body components 20 and 22, the clamping means 40 are then moved to their released position thereby disengaging from the now-assembled body components 20 and 22. The lifting assembly 28 (FIG. 3) is then moved to its lowered position thus placing the now-assembled body components on the skid 24.

Simultaneously with placing the body back on the skid 24, the lowered arm 72 is returned to its raised position and the turret assemblies 60 are moved to their standby position laterally spaced from the conveyor 12 to allow not only the now-assembled body to exit from the assembly station 18, but also to enable a new body preassembly 16 to enter into the assembly station 18.

Although the operation of the invention should be clear, it will be summarized for the sake of clarity.

With reference then to FIG. 1, assuming that the turret assemblies 60 are both in their standby position (illustrated in phantom line) a body preassembly 16 is first moved into the assembly station 18. The drive means 64 are then actuated to move both of the turret assemblies 60 to their operative position in which the turret assemblies 60 are aligned with the conveyor 12.

With reference now to FIG. 2, the turret assemblies 68, with the arms 72 in their raised position, are then indexed about their vertical axes 68 in order to bring one arm 72 on each turret assembly 60 so that said one arm faces the assembly station 18. The indexing of the turret assembly 60 about their vertical axes 68 can occur either after the turret assembly 60 is moved to its operative position, prior to moving the turret assembly from its standby and to its operative position, or during the travel of the turret assembly 60 from its standby and to its operative position. Furthermore, the turret assemblies 60 are indexed about their vertical axes 68 in order to bring the appropriate arm 72 with its associated clamping means 40 corresponding to the preassembly 16 positioned at the assembly station 18.

The actuator 76 associated with the arm facing the assembly station 18 on each turret assembly 60 is then actuated to move that arm from its raised position and to its lowered position until the free ends of the arms 72 abut against each other as shown in solid line in FIG. 2. The clamping means 40 on the abutting arms of 72 are then actuated in order to precisely position the body components in the previously described fashion.

After a proper positioning of the body components by the clamping means 40, the robotic welders 54 weld the body components 20 and 22 together. Thereafter, the clamping means 40 disengage from the now-assembled body components 20 and 22. As the now-assembled body components are lowered back onto the skid 24, the lowered arm 72 on each turret assembly 60 is returned to its raised position and the turret assemblies 60 are moved to their standby position illustrated in phantom line in FIG. 1. Upon doing so, the now-assembled vehicle is moved from the assembly station 18 and the next unassembled preassembly 16 is moved into the assembly station 18. The above procedure is then repeated.

From the foregoing, it can be seen that the present invention achieves several advantages over the previously known framing systems. One such important advantage is that, since the turret assemblies 60 are floor mounted, the ceiling space necessary to accommodate the framing system of the present invention is much less than the previously known systems. This, in turn, reduces maintenance costs and maintenance access costs.

A still further advantage of applicant's invention is that the framing system of the present invention is less expensive in construction than the previously known framing systems.

Having described my invention, however, many modifications thereto will become apparent to those skilled in the art to which it pertains without deviation from the spirit of the invention as defined by the scope of the appended claims.

I claim:

1. An automotive framing system for positioning a lower body component and at least two upper body components together, said upper body components being positioned on top of said lower body component to form a body preassembly, said framing system comprising:

conveyor means for sequentially moving body preassemblies to a predetermined assembly station, means at said assembly station for lifting said lower body component and said upper body components from said conveyor means to a predetermined elevated position in which said lower body component abuts against said upper body components, at least two turret assemblies, means for movably mounting said turret assemblies to a ground support surface in a direction transverse to said conveyor means at opposite ends of said assembly station between an operative position in which said turret assemblies are aligned with said conveyor means and a standby position in which said turret assemblies are laterally spaced from said conveyor means, each turret assembly comprising a base and at least two circumferentially spaced arms, each arm being pivotally secured adjacent one end to said base, means for selectively indexing said base between at least two rotational positions so that one of said arms faces said assembly station, means operable when said turret assemblies are in said operative position for pivoting said arms between a raised position in which said arms extend upwardly from said base and a lowered position in which the other ends of said facing arms on said turret assemblies engage each other, clamping means mounted to each arm and selectively movable when said arms are in said lowered position between an engaged position and a released position, wherein in said engaged position, said clamping means engage predetermined location points on said upper and/or lower body components of said preassembly and hold said upper and/or lower body components of said preassembly together at preset positions relative to each other, and wherein in said released position, said clamping means disengage from said preassembly to enable removal of said preassembly from said assembly station.

2. The invention as defined in claim 1 and comprising at least three circumferentially spaced arms on each said turret assembly.

3. The invention as defined in claim 1 wherein said conveyor means sequentially moves said preassemblies along a predetermined path of travel, said assembly station being positioned at a mid point of said conveyor means.

4. The invention as defined in claim 1 wherein said framing system is supported by a floor.

5. The invention as defined in claim 1 wherein said conveyor means comprises a pair of elongated rails, a skid associated with each preassembly, said skid supporting its associated preassembly, and means for longitudinally movably mounting said skid to said rails.

6. The invention as defined in claim 1 and comprising means at said assembly station for fixedly securing said body components together when said clamping means is in said engaged position.

7. The invention as defined in claim 6 wherein said fixedly securing means comprises at least one welder.

8. The invention as defined in claim 7 wherein said welder is a robotic welder.

9. The invention as defined in claim 1 and comprising at least three circumferentially spaced arms pivotally mounted to each of said turret assemblies.

10. The invention as defined in claim 1 wherein said means for moving said turret assemblies further comprises means for moving a section of said conveyor means into alignment with said conveyor means when said turret assemblies are in said standby position.

* * * * *